United States Patent [19]

Sutherst et al.

[11] Patent Number: 5,205,063

[45] Date of Patent: Apr. 27, 1993

[54] INSECT TRAP

[75] Inventors: Robert W. Sutherst; Robert S. Tozer, both of Queensland, Australia

[73] Assignee: Commonwealth Scientific and Industrial Research Organization, Australian Capital Territory, Australia

[21] Appl. No.: 872,413

[22] Filed: Apr. 23, 1992

[30] Foreign Application Priority Data

Apr. 24, 1991 [AU] Australia ............................ 75380/91

[51] Int. Cl.⁵ .............................................. A01M 1/20
[52] U.S. Cl. ...................................................... 43/107
[58] Field of Search ................................... 43/107, 111

[56] References Cited

U.S. PATENT DOCUMENTS

| | | | |
|---|---|---|---|
| 516,048 | 3/1894 | Guthrie | 43/107 |
| 562,758 | 6/1896 | Chenault | 43/107 |
| 580,163 | 4/1897 | Richter | 43/107 |
| 642,399 | 1/1900 | White et al. | 43/107 |
| 645,880 | 3/1900 | Varnum | 43/107 |
| 701,873 | 6/1902 | Gibson | 43/107 |
| 743,340 | 7/1903 | Lampton | 43/107 |
| 870,360 | 11/1907 | Harbuck | 43/107 |
| 1,258,763 | 3/1918 | Girven et al. | 43/107 |
| 1,260,339 | 3/1918 | Crockenberger | 43/107 |
| 4,069,615 | 1/1978 | Gilbert | 43/107 |

Primary Examiner—Kurt C. Rowan
Attorney, Agent, or Firm—Nixon & Vanderhye

[57] ABSTRACT

An insect trap includes a housing having a support frame; a skin of flexible transparent or translucent material attached to and covering the support frame to thereby provide a housing interior which is substantially totally exposed to sunlight. A walk through passage extends through the housing, and the flexible skin is spaced from the walk through passage to provide a spacing in the housing. One or more partitions are located in the spacing along with brush elements forming a dense curtain in the walk through passage for brushing flies off an animal passing through the housing in the walk through passage. The brush elements are formed from dark material in contrast to the flexible skin so that insects parted from the animal by the brush elements will be attracted to the flexible skin for subsequent desiccation.

16 Claims, 5 Drawing Sheets

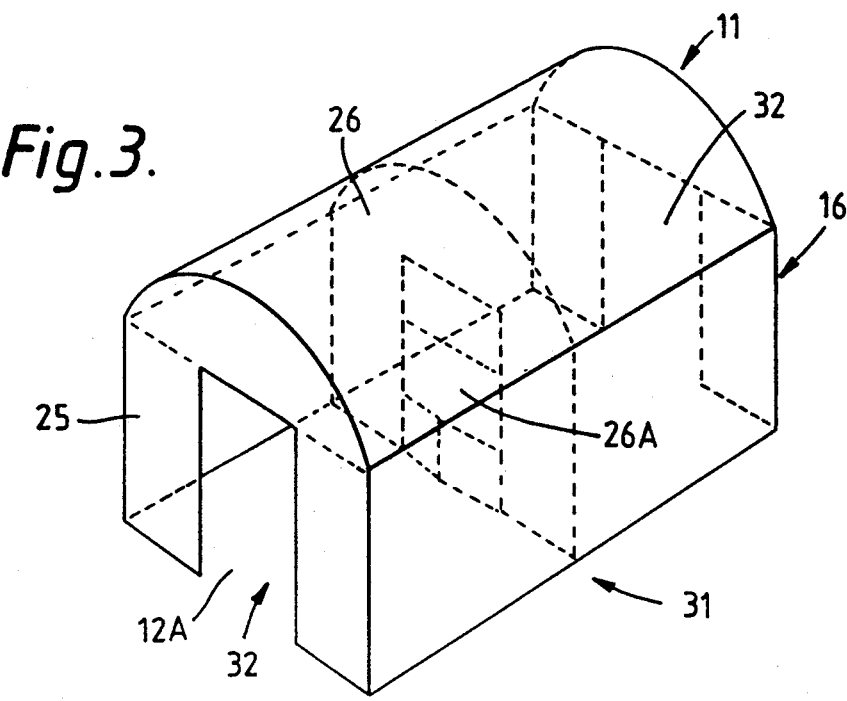
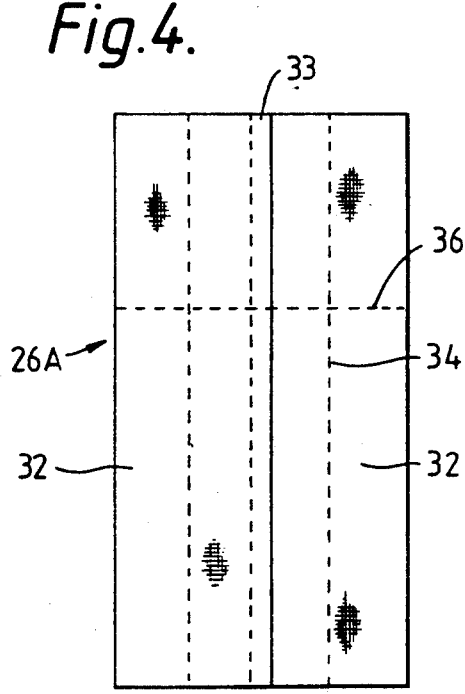
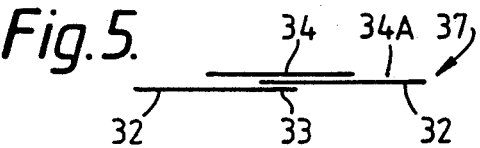
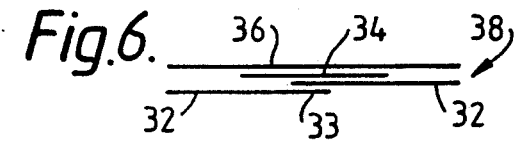
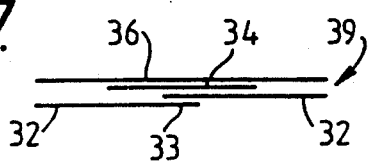

INSECT TRAP

This invention relates to an insect trap. The invention has been developed for control of buffalo fly or horn fly infestation on cattle and will be described in this context. However it will be appreciated that the invention is not limited to this particular application and could be used for control of flying insects on other animals.

The Australian buffalo fly, *Haematobia irritans exigua* is a blood-sucking fly which remains on its bovine host throughout its adult life, with brief absences by the females to oviposit in the host's fresh dung. The fly is a subspecies of the better known horn fly, *H. irritans irritans* in Asia, Europe and North America. There are few reliable estimates of the effect of *Haematobia* spp. on the growth rates of cattle (Palmer & Bay 1981). However, recently Haufe in Can. J. Animal Sci 62 567–573 (1982) and Can. J. Animal Sci 66 575–589 (1986) estimated an 16–18% reduction in liveweight gain over a summer season in Canada in the presence of an average of 200 flies/animal. Buffalo fly populations greatly exceed 200/beast for much of the summer in northern Australia and so are likely to be responsible for substantial losses in production. The fly also transmits a species of Stephanofilaria which is associated with severe lesions on cattle (Johnson, Arthur & Shepherd, Aust. Vet J 63 121–4 (1986).

Buffalo fly infestation of cattle in the northern regions of Australia is a continuing problem. The flies suck on the blood of the host and the irritation caused by their biting and sensation of their presence On the hide is a source of worry to animals. The cattle usually try to rid themselves of flies by rubbing against posts and trees. However this causes sores to develop which increases the irritation. The disturbance to feeding and resting and the energy expended by animals in their efforts to get rid of the flies result in economic loss. For example, fly worry causes a drop in milk production on dairies and delays in the fattening of beef cattle.

Control of buffalo fly in Australia has relied almost entirely on frequent spraying dipping or pour on treatments with insecticides, although in recent years slow release devices, such as insecticide impregnated eartags, have been used by some graziers. The repeated development of resistance has resulted in the loss of residual protection against the fly (Schnitzerling et al. CSIRO J. Aust. ent. Soc. 1982 21 77–80) and the horn fly in north America (Kunz et al J. Agric. Entol. 2 356–363 (1985)). Insecticides not only are expensive, subject to failure from resistance and sometimes dangerous to the user, they also pose a hazard to the environment when disposed of.

The dairy industry around the world is particularly vulnerable to unwanted side effects of the use of insecticides. Milking cows in particular cannot be withheld from milking to allow residues to dissipate and insecticide used around milking sheds can contaminate cattle feed and milk.

Prior fly traps have been disclosed in Parrott (1899) in a reference entitled "A horn fly trap experiment" in Kansas State Agricultural College Entomology Department Press Bulletin No. 49, Bruce in J Kans. Entomol. Soc. 11 88–93 (1938) entitled "A practical trap for the control of horn flies on cattle" and also in USDA Bureau of Entomology E-498 reference (1940) entitled "A cattle fly trap for the control of horn flies". Reference may also be made to a buffalo fly trap discussed in the Australian periodical The Agricultural Gazette Vol LV, dated Dec. 1, 1944 pages 540–1, and also Vol LVII dated April 1946 and The Agricultural Gazette dated Aug. 1, 1946. Further reference may also be made to Hall and Doisy in J. Econ. Entomol 82(2):530–534 (1989) entitled "Walk through trap to control horn flies on cattle".

The Parrott reference described a trap comprising a dark space or room. At the centre of the room, in the roof was a glass cupola or dome having a side periphery comprising four window sashes and a large pane of glass for a roof. The trap was so designed that as the animal went under the cupola it passed through a doorway lined with brushes. It was hoped that the flies upon being disturbed would be attracted to the greatest light and would therefore swarm up into the cupola. It was found however that it was impossible to get all the flies to remain on the animal until the brushes were reached as invariably the flies would pass out of the trap at the entrance resulting in only 5% of the flies being trapped.

The 1938 Bruce reference includes a description of the Parrott trap which is given above and also refers to a similar trap known as the Loughman trap which is a dark building through which the cattle may walk and brush off any flies. The 1938 Bruce reference also discloses a trap of timber frame walk through construction having a plywood roof with trapping elements inserted in opposed sides. Each trapping element comprised a wall formed from mesh of corrugated or wave like shape in end view having alternating outer peaks and inner valleys defined relative to the interior of the trap. At each peak were provided a plurality of holes to enable the flies to escape the interior of the trap. The holes were designed to allow the flies to crawl through and be subsequently trapped between each trapping element and an external mesh wall. The Bruce trap also included a series of strips made of canvas or old carpet to dislodge the flies from the body of the animal passing through the interior of the trap. The 1940 Bruce reference describes a similar trap.

The Agricultural Gazette 1944 reference describes a chamber with gauze wire trapping boxes forming each side thereof. Flies were brushed off cattle by drapings as they passed through a central passageway through the chamber and subsequently travelled t the light being emitted from the gauze boxes. The flies entered the boxes and were then held captive before dying in 24–48 hours. The structure of the gauze trapping boxes were unduly complex and were similar to the trapping elements of the Bruce trap.

The April 1946 as well as the August 1946 Agricultural Gazette reference described a development of the trap reported in the 1944 Agricultural Gazette with the modification that the gauze boxes were replaced with panes of glass impregnated with the insecticide DDT (dichlorodiphenyltrichloroethane) on an internal surface thereof. Flies were brushed off cattle passing through the trap and were attracted to the internal surface of the panes of glass whereby they received a lethal dose of insecticide.

The Hall and Doisy reference above described a modern version of the Bruce trap.

It therefore was to be appreciated that up to the present time there has not been developed a fly trap for use with cattle that has been commercially effective. The best results so far attained have been in relation to the Bruce trap which have shown to be approximately 50 per cent effective or which gave approximately 50 per cent control of flies when averaged over the season. This level of control was less than that afforded by insecticidal ear tags and other treatments involving insecticide but maintained the flies below the injury level of about 200 flies per animal (Agricultural Guide published by the University of Missouri Columbia Extension Division (1989)). The use of insecticidal ear tags which is described in Ahrens—Southwest. Entomol. 2 8-10 (1977) has lost favour because the horn flies rapidly developed resistance to the pyrethroid insecticide used.

The use of the Bruce trap described above was not considered commercially appropriate because of the cost involved in construction and also because of the fact that 50 per cent control was not believed to be commercially viable. The Bruce trap also was not adapted for mass production in kit form.

It therefore is an object of the present invention to provide an insect trap which is commercially effective and may alleviate the disadvantages of the prior art.

The insect trap of the invention includes a housing having a support frame; a skin of flexible transparent or translucent material attached to the support frame; a walk through passage extending through the housing, said skin of plastics material being spaced from said walk through passage to provide a spacing in said housing and one or more partitions being located in said spacing, and brush means forming a dense curtain in said walk through passage for brushing flies off an animal passing through said housing in said walk through passage wherein said brush means is formed from dark material in contrast to said flexible skin whereby insects parted from said animal by said brush means which functions as a deterent to said insects may be attracted to said flexible skin for subsequent desiccation.

The support frame may have any suitable shape and thus comprise a pair of rows of peripheral uprights which may be spaced from each other to form the side walls of the housing when the flexible skin is attached to the support frame. The support frame may also include a pair of inner rows of uprights wherein each inner row defines the walk through passage.

However the above arrangement is only optional. It will be appreciated that the walk through passage may be formed from a cattle race being passed through the walk through passage and extending outwardly therefrom at each end. The cattle race may comprise a preformed floor and side rails and uprights. In this arrangement the support frame for the housing may only comprise a pair of outer rows of peripheral uprights.

The roof of the housing may be formed in any suitable manner. In one arrangement the roof may be formed by a plurality of cross members interconnecting each peripheral upright. However while a flat or substantially planar roof may be utilised it is preferred that the roof may be formed from a plurality of cross members each having a base frame member and a top arcuate frame member which may be spaced from each other and supported by the outer rows of peripheral uprights.

A rounded or arcuate roof which is suitably of concave shape is preferred for ease of manufacture and wind resistance.

The transparent flexible material may be suitably chosen from UV protected transparent or translucent plastics material such as polypropylene or other form of plastics sheet. However other appropriate translucent or transparent fabric may be utilised. The partitions may also be formed from transparent or translucent material as described above or alternatively may be formed from dark coloured shade cloth which is suitably fibre reinforced.

The brush means may comprise any appropriate type but suitably includes an array of monofilaments or fibres which are suspended from a suitable support and hang vertically downwardly to contact the body of the animal as the animal passes through the housing. Suitably each fibre or filament may have a thickness of 0.5 mm to 4.0 mm. If desired there may be provided a number of arrays of monofilaments whereby a first array of monofilaments may contact the back of the animal, a second array of monofilaments contact the sides and upper body of the animal and if desired a third array of monofilaments contact the lower legs and belly of the animal. Preferably the first and second array of monofilaments are oriented vertically and the third array of monofilaments are oriented horizontally in two separate sections on each side of the walk through passage.

If desired however instead of the monofilaments the brush means may comprise a dense curtain of dark shade cloth or other suitable fabric which may include one or more suitably an array or plurality of curtain segments.

Suitably one or each of the entry end and exit ends of the housing may be provided with a plurality of straps or drapes which also may contact the body of the animal as it enters or leaves the housing.

Reference may now be made to a preferred embodiment of the invention as shown in the attached drawings wherein:

FIG. 3 is a perspective view of another form of insect trap which may be used in the present invention;

Figure 1:
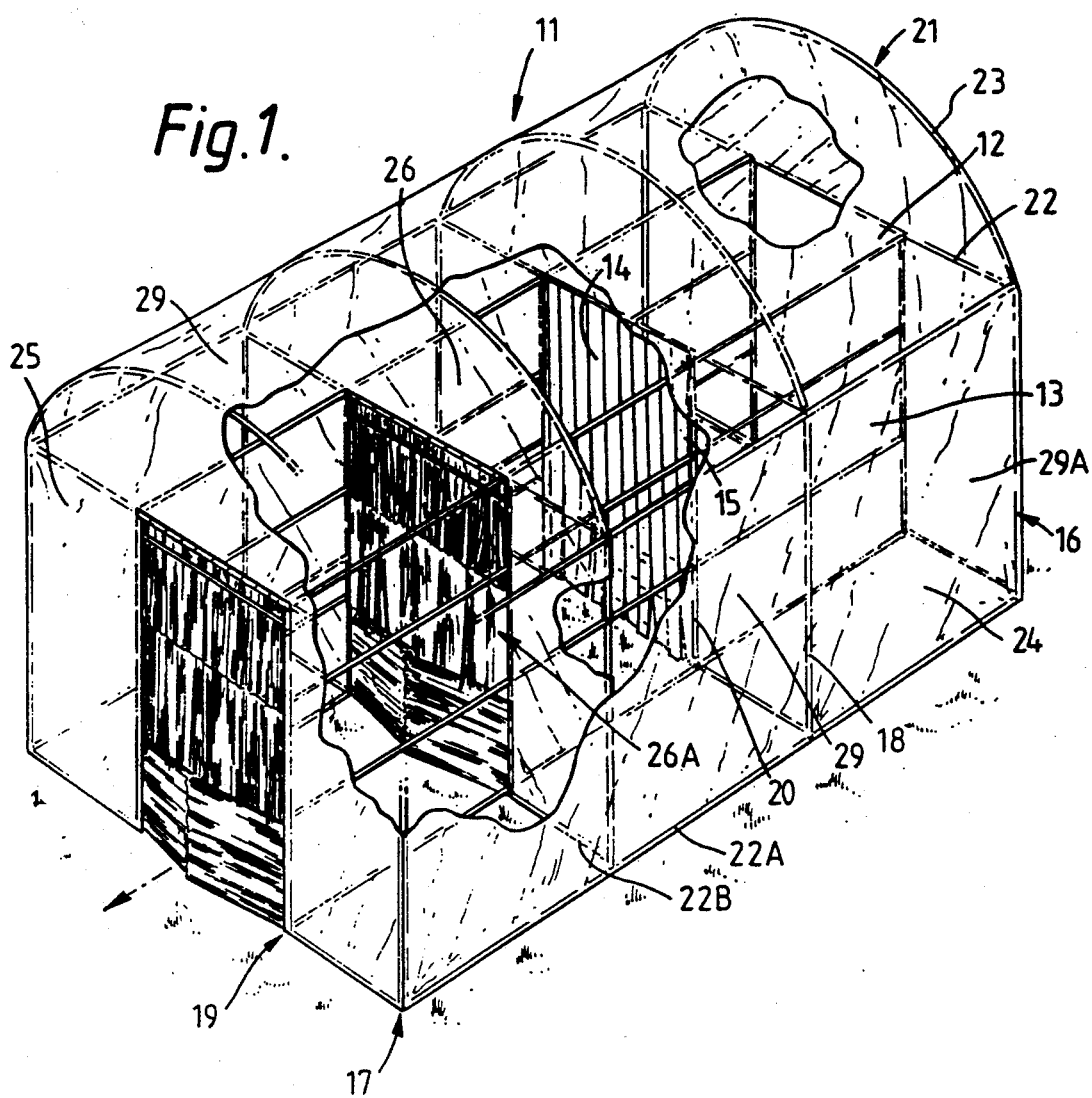
FIG. 1 is a perspective view of an insect trap constructed in accordance with the invention.
Figure 8:
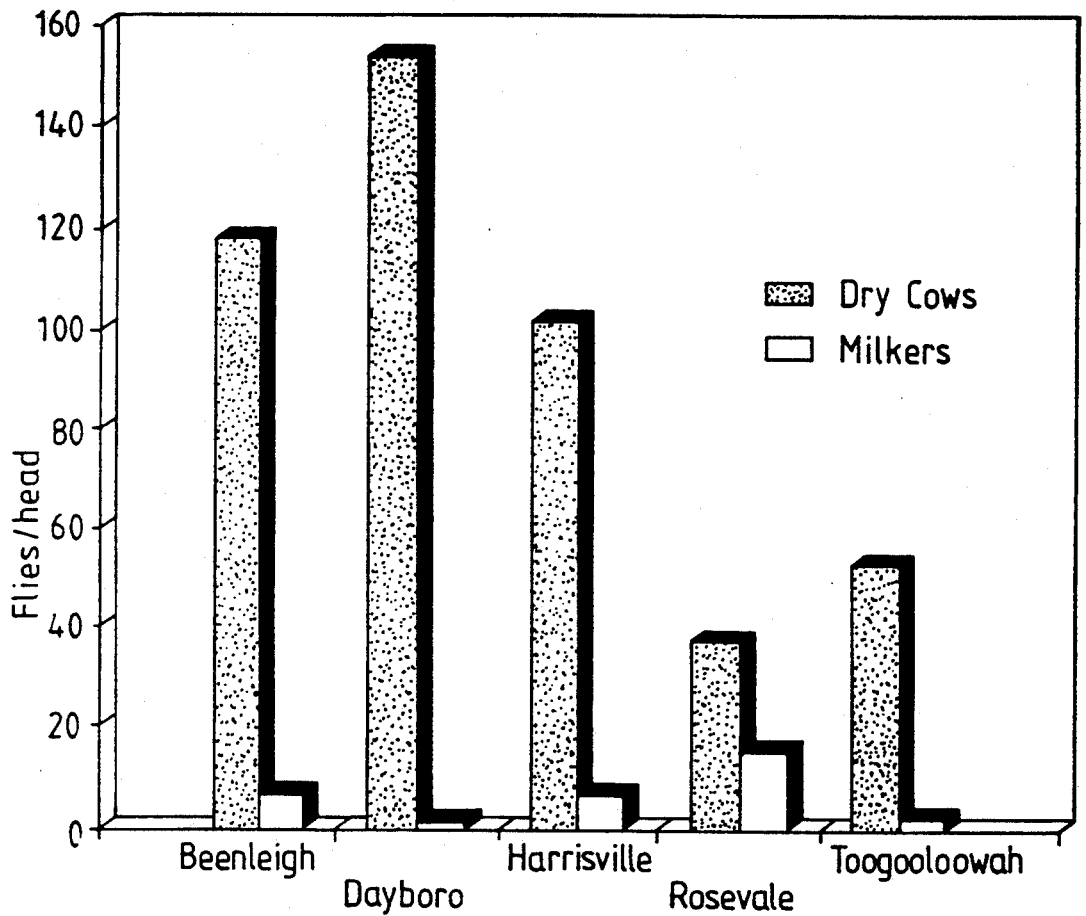
Figure 9:
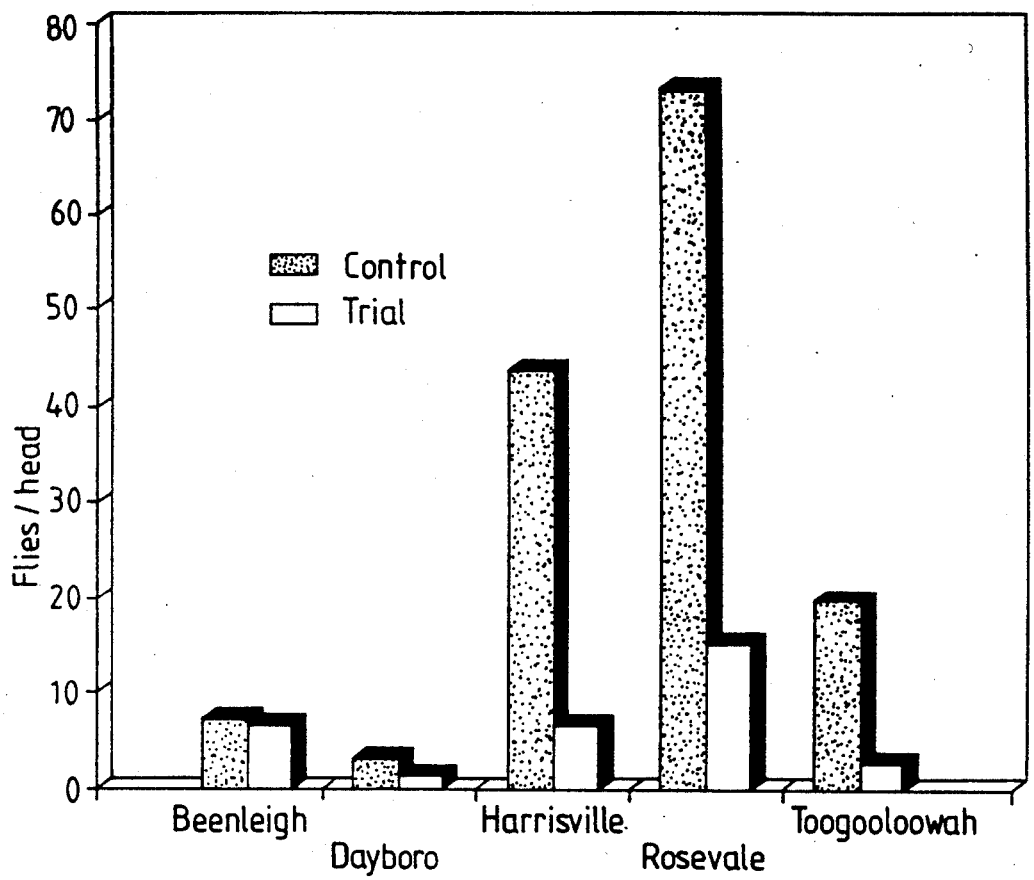
Figure 10:
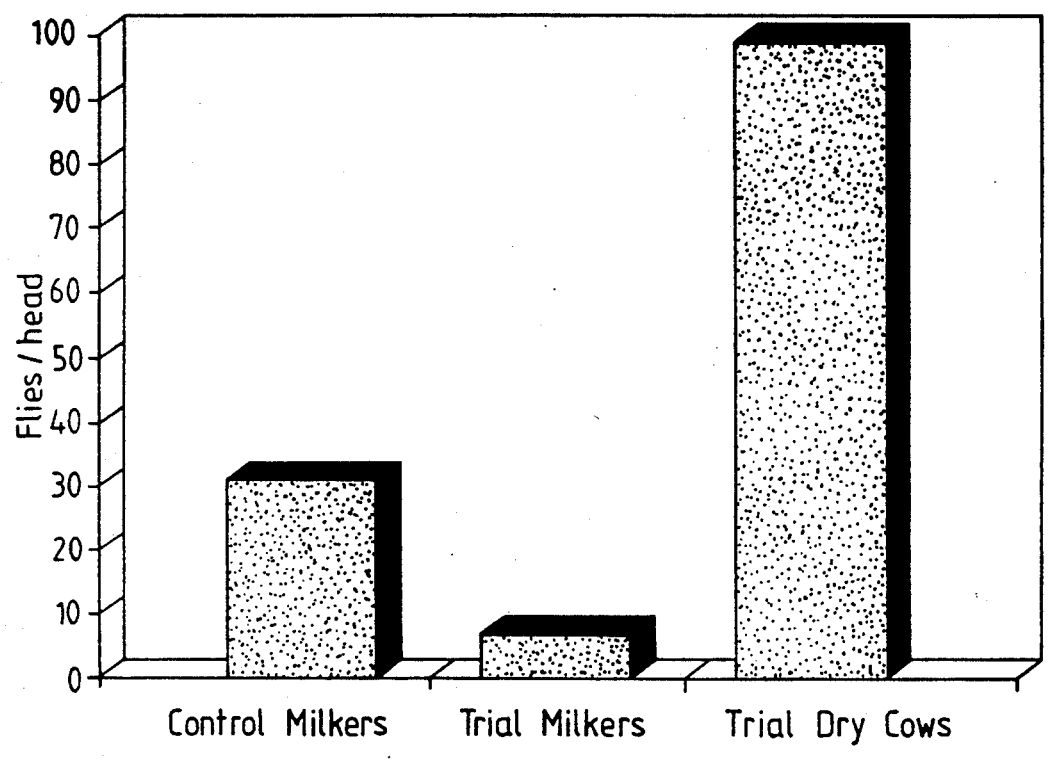

FIGS. 4, 5, 6 and 7 describe the use of dark shade cloth curtain segments as the brush means in contrast to the monofilament arrays used in FIG. 1; and FIGS. 8, 9 and 10 are graphs illustrating the results of fly control trials using traps constructed in accordance with the invention.

The trap 10 shown in FIG. 1 includes a housing 11 having a walk through passage 12, entry end 13, exit end 14, drapes 15, support frame 16 including a pair of rows 17 of peripheral uprights or posts 18, a pair of rows 19 of inner posts 20 and arcuate roof members 21 including a base member 22 and arcuate member 23. There is also included ground support longitudinal members 22A and cross members 22B. The support frame 16 is covered with a flexible skin 24 which may be transparent or translucent as shown. The walk through passage 12 is spaced from the flexible skin 24 by spacing or gap 25 which may be filled with a partition 26 which partition 26 is located at spaced intervals along the length of housing 11. Suitably there are provided an entrance compartment 29A and two subsequent apartments 29.

Figure 2:
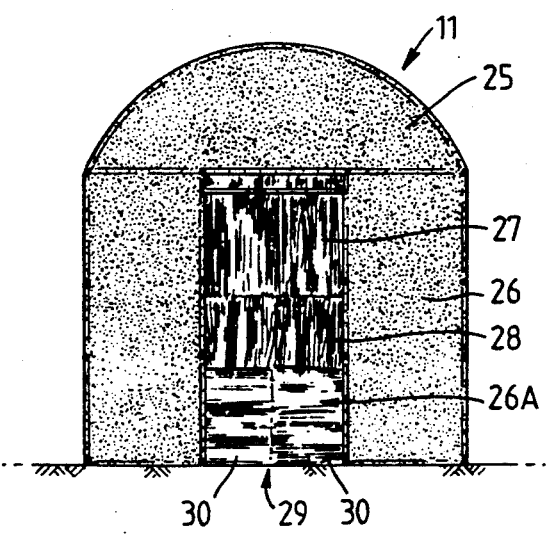
FIG 2 is a front view of a partition surrounding the walk through passage and brush means associated therewith.

It is preferred that the partition 26 be light coloured as shown in FIG. 1 although it may be dark coloured at least in part or completely dark as shown in FIG. 2. It is essential in relation to the invention that the brush means 26A be dark or black as shown in FIG. 1 and FIG. 2. The brush means 26 may include a first array of filaments 27 which are vertically oriented as shown and which may preferably have a thickness of 2.0 mm and have a length of 150–250 and more suitably 200 mm. The brush means 26 may also include a second array of filaments 28 which also may be vertically orientated having a thickness of 0.5–2.00 mm and more suitably 0.9 mm. The second array of filaments 28 may also have a length of 300–500 mm and more suitably 400 mm and be suspended from a common support with array 27.

There also may be utilised a third array of filaments 29 each divided into sections 30 on either side of passage 12 as shown. Filaments 29 may have a similar thickness to filaments 27.

It has been found useful to provide two different forms of insect trap in accordance with the invention. In relation to trap 10 shown in FIGS. 1 and 2 this may have a one way walk through passage 12 and is useful in being located at the exit race of a milking shed and thus is appropriate for dairy cattle. In another form of trap 31 shown in FIG. 3 there is provided a walk through passage 12A which can be used for entry purposes at each end 32. Suitably also drapes 15 may be omitted from trap 30 which may be used for beef cattle and thus be located anywhere in a paddock or range.

The brush means 26A in another alternative may use dark or black shade cloth curtains as shown in FIGS. 4–7. In regard to entrance compartment 29A the brush means 26A may include two curtains 32 attached to opposed side locations of walk through passage 12 which may partially overlap in the centre of passage 12 as shown at 33 and another curtain 34 located rearwardly of curtains 32 and adjacent overlapping area 33. The curtain 34 may be spaced from the sides of passage 12 by gaps 34A best shown in FIG. 5. The curtain arrays shown in FIGS. 6–7 may be similar to the array already shown in FIG. 5 but may additionally include a rear curtain 36 extending downwardly only about a quarter of the height of passage 12 as shown in FIG. 4. Suitably curtain 36 has an elastic or resilient peripheral cord which may contact the back of an animal walking through passage 12. Each of curtains 32, 34 and 36 may be provided with a metal weighted bottom seam (not shown) to tension the curtains and cause them to return to their normal position after displacement. Also horizontal stiffening strips may be attached to the bottom of each curtain to avoid folding.

The curtain array 37 shown in FIG. 5 may be located at partition 26 between compartments 29A and the adjacent compartment 29 in substitution of drapes 15. The curtain array 38 may be located at the adjacent partition 26 intermediate compartments 29 and the final curtain array 39 may be located at the exit end of passage 12.

The insect trap of the invention in having a skin of transparent or translucent material allows the passage of sufficient sunlight to heat the housing interior for desiccation of flies therewithin. The brush means 26A is formed from a black or dark coloured material to provide a deterrent for flies remaining on the body of the animal as it approaches brush means 26A whereby the filaments of the brush means provide a dense curtain through which the animal must pass. The spacing 25 is useful in that it enables the flies to approach the source of light provided by the transparent or translucent skin 24 away from the dense curtain 26A. The flies in this regard are normally strongly attracted to the light and will fly to the inside surface of skin 24 where they remain trying to get out towards the light. The flies have a limited life span in hot dry conditions away from their animal hosts which they feed on about 18 times a day.

The transparent or translucent skin 24 on each side and the ceiling of housing will allow the sun light to penetrate and raise the internal temperature of the housing 11 to levels well above ambient, such that the flies rapidly desiccate from the heat within the chamber.

Preferably the drapes 15 which may initially brush the animals back comprise relatively stiffly flexible strips, for example of polyethylene, forming a curtain hanging vertically over the walk through passage 12 to displace flies from the sides of the animals.

However the drapes 15 cannot form a suitable brush means 26A in accordance with the invention because as an animal parts the drapes a V shaped gap is provided at the top of the drapes which may be easily traversed by flies or other flying insects. This is a major reason why the prior art traps were not effective in use.

The partitions 26 which are used in the insect traps of the invention are also necessary because they function as a seal around the walk through passage 12 adjacent the brush means 26A so that the insects are constrained to fly to the internal surface of skin 24.

Strategic placement of traps according to the invention allows effective control of buffalo or horn fly populations. Thus, with milking cows for example, the trap may be built into the fence of the milking yards such that the cattle must pass through it, usually twice daily. For grazing cattle, the trap may be located between the pasture and a water source or a salt lick for example, such that the cattle pass through it en route to the water or salt. The trap is best employed in a forced use situation where cattle must pass though it on a regular basis. However cattle can be trained to seek out the traps in the same way as they use self dispensing "backrubber" devices.

Appropriately located traps reduce the breeding incidence of the flies by not allowing them to remain on cattle for the required two days before they can lay any eggs in the animals dung.

The housing when used for an installation in dairies may have an overall length of 4.5 m which is divided by partitions 26 into an entrance compartment 29A 1.5 m long, followed by two compartments 29 each 1.5 m long. The length of the entrance compartment 29A is chosen to allow the cattle to get into the chamber before the flies are brushed off. It is anticipated that one or more standard sized housings 11 will be built in demountable modular form (i.e. the housing may be constructed of readily demountable prefabricated sections) which will allow different sized installations to be readily constructed.

Dimensions for an example housing 11 according to the invention are: Height 2.8 m with a 1.8 m high walk through passage 12, width 2.3 m (leaving 0.75 m space either side of a 0.8 m wide walk through passage). The lengths of curtains 32 and 34 may be 1.8 m and the length of curtain 36 may be 450 mm.

FIG. 8 illustrates a comparison of buffalo fly numbers on 5 herds of milking cows using the trap with dry cows in different herds on the same farms. The dry cows data are shown cross-hatched while the milkers data are not cross-hatched. Clearly, fly control on the milkers using traps according to the invention is very effective in comparison to fly populations on the dry cows (i.e. the milkers have much lower "flies/head" than the dry cows as a result of use of the traps). This advantage was obtained despite normal treatment of the dry cattle with insecticidal sprays.

FIG. 9 illustrates a comparison of average buffalo fly numbers on milkers using traps according to the invention (non cross-hatched bars) with fly numbers on 5 adjacent control herds (cross-hatched bars) using normal insecticide based fly control measures. (Very few flies were found on any animals on one control farm, possibly caused by heavy use of fowl manure as fertiliser). The data illustrates that fly control using the traps is more effective than insecticide based control measures.

FIG. 10 illustrates average numbers of flies on milkers using traps on trial farms as against flies on dry cows not using the traps on the same farms, and on milkers on control farms without traps.

Persons skilled in the art will appreciate that additions and modifications may be made to the invention without departing from its spirit and scope. All such additions and modifications are to be understood as encompassed by the invention as above described.

What is claimed is:

1. An insect trap including a housing having a support frame; a skin of flexible transparent or translucent material attached to and substantially covering the support frame to thereby provide a housing interior which is substantially totally exposed to sunlight; a walk through passage extending through the housing interior, said flexible skin being spaced from said walk through passage to provide a spacing in said housing interior, and at least one partition being located in said spacing, and brush means forming a dense curtain in said walk through passage for brushing flies off an animal passing through said housing interior in said walk through passage wherein said brush means is formed from dark material in contrast to said flexible skin whereby insects parted from said animal by said brush means may be attracted to said flexible skin in said housing for subsequent desiccation after exposure to the sunlight passing through said flexible skin.

2. An insect trap as claimed in claim 1, wherein said at least one partition is formed from transparent or translucent material.

3. An insect trap as claimed in claim 1, wherein said at least one partition is formed from dark or black material.

4. An insect trap as claimed in claim 1, wherein the support frame includes a pair of outer rows of peripheral uprights to which said flexible skin is attached.

5. An insect trap as claimed in claim 4, wherein there is provided a pair of inner rows of uprights which constitute said walk through passage.

6. An insect trap as claimed in claim 5, wherein said spacing is formed by a gap between an outer row of peripheral uprights and an adjacent inner row of uprights.

7. An insect trap as claimed in claim 6, wherein said brush means is located in said housing so that said brush means substantially occupies said walk through passage at at least one location intermediate the ends of said walk through passage.

8. An insect trap as claimed in claim 7, wherein said brush means is surrounded by an adjacent partition at said at least one location.

9. An insect trap as claimed in claim 7, wherein said brush means comprises a plurality of monofilaments.

10. An insect trap as claimed in claim 9, wherein there is provided a first array of monofilaments for contacting the back on an animal passing through said walk through passage, a second array of monofilaments for contacting the sides and upper body of the animal and a third array of filaments for contacting the lower legs and belly of the animal.

11. An insect trap as claimed in claim 7, wherein said brush means includes a plurality of hanging curtains.

12. An insect trap as claimed in claim 11, wherein said plurality of hanging curtains include a pair of curtains partially overlapping at a central location of the walk through passage.

13. An insect trap as claimed in claim 12, wherein there is provided a third hanging curtain located adjacent to said pair of curtains at said central location.

14. An insect trap as claimed in claim 13, wherein there is provided a fourth curtain located adjacent to said third curtain which depends from said support frame only partially of the height of said walk through passage to contact the back of the animal.

15. An insect trap as claimed in claim 7, wherein said brush means is located at two spaced locations in said walk through passage.

16. An insect trap including a housing having a support frame; a skin of flexible transparent or translucent material attached to and substantially covering the support frame to thereby provide a housing interior which is totally exposed to sunlight; a walk through passage extending through the housing interior; brush means forming a dense curtain in said walk through passage which contacts substantially all parts of an animal passing through said housing interior in said walk through passage for brushing flies off the animal wherein said brush means is formed from dark material; said skin of flexible material being spaced from said walk through passage to provide a spacing in said housing interior and at least one partition being provided in said spacing surrounding said brush means to prevent, in combination with said brush means, flies passing through the housing interior towards an exit of the walk through passage and thereby forcing the flies to be attracted to said flexible skin away from the dark brush means whereafter said insects may subsequently desiccate after exposure to the sunlight passing through said flexible skin.

* * * * *